United States Patent [19]

Tabata

[11] Patent Number: 5,170,256
[45] Date of Patent: Dec. 8, 1992

[54] IMAGE DISPLAY SYSTEM FOR DISPLAYING PICTURE WITH SMALLER ASPECT RATIO ON LARGE-ASPECT-RATIO SCREEN OF TELEVISION RECEIVER

[75] Inventor: Toshio Tabata, Tokyo, Japan

[73] Assignee: Pioneer Electronic Corporation, Tokyo, Japan

[21] Appl. No.: 691,878

[22] Filed: Apr. 26, 1991

[30] Foreign Application Priority Data

Sep. 17, 1990 [JP] Japan .................................. 2-244097

[51] Int. Cl.[5] .............................................. H04N 5/64
[52] U.S. Cl. ..................................... 358/230; 358/141; 358/180
[58] Field of Search ................. 358/230, 56, 140, 141, 358/180

[56] References Cited

U.S. PATENT DOCUMENTS

| | | | |
|---|---|---|---|
| 4,556,906 | 12/1985 | Dischert et al. | 358/180 |
| 4,670,784 | 6/1987 | Goldberg | 358/141 |
| 4,760,455 | 7/1988 | Nagashima | 358/242 |
| 4,928,182 | 5/1990 | Guerinot et al. | 358/141 |
| 4,953,025 | 8/1990 | Saitoh et al. | 358/230 |

FOREIGN PATENT DOCUMENTS 59-72284 4/1984 Japan .

Primary Examiner—James J. Groody
Assistant Examiner—Jeffrey S. Murrell
Attorney, Agent, or Firm—Sughrue, Mion, Zinn, Macpeak & Seas

[57] ABSTRACT

When a composite color TV signal of standard NTSC system with a 4-to-3 aspect ratio and 525 scanning lines is received by a TV receiver with a large aspect ratio of 16 to 9, the NTSC signal is separated into a color video signal for picture and a character data signal. The color video signal for picture is written into a first buffer at a timing of a first clock whose frequency is four times that of an input color subcarrier. The character data signal is written into a second buffer at a timing of a second block with a frequency 16/5 times that of the color subcarrier. The picture video signal and the character data signal are alternately picked up by a selector that swiches between the two buffers at a specified horizontal position on the screen at a timing of a third clock whose frequency is 4/3 times that of the first clock. The output of the selector is fed to the TV receiver to produce a picture on one side of the screen and character data on the other side, utilizing the whole area of the screen. This prevents uneven degradation of the CRT, as would be caused by a partial use of the screen.

4 Claims, 2 Drawing Sheets

IMAGE DISPLAY SYSTEM FOR DISPLAYING PICTURE WITH SMALLER ASPECT RATIO ON LARGE-ASPECT-RATIO SCREEN OF TELEVISION RECEIVER

BACKGROUND OF THE INVENTION

1. Field of the Invention

The present invention relates to an image display system which displays on a screen of a television receiver with a large aspect ratio a picture smaller in size than the TV screen.

2. Prior Art

As an increasing number of television sets incorporate a large screen, flickers and blurs that so far have not been noticeable because of visual characteristic of small screens show up conspicuously. There are growing demands for improving the picture quality of the television sets and, to meet these demands, a variety of kinds of high picture quality television system are being developed.

An improved-definition TV or IDTV, for example, is compatible with the current NTSC (National Television System Committee) standard and designed to improve picture quality by introducing a sophisticated signal processing in the receiver side. Among the major features of the IDTV are an elimination of cross interference between color and luminance signals by a motionadapted separation of brightness and color signals and a progressive scanning of an increased number of noninterlaced lines. An extended-definition TV or EDTV, like the IDTV system, removes factors responsible for image quality degradation experienced with the standard NTSC system and introduces improvements on the image sending side to enhance the picture quality and resolution. In addition to the motion-adapted separation of brightness and color signals and the progressive scanning, the EDTV has also realized improvements on the horizontal resolution by expanding the bandwidths of brightness and color signals, elimination of ghost by inserting the primary color signals and introduction of a wide aspect ratio.

While both of the two systems comply with the current NTSC system, a high-definition TV or HDTV aims at the next generation ideal television system, not restricted by the conventional NTSC standard. Not only does the HDTV system have far better image and sound qualities than the present NTSC system but it also provides highly visual and psychological effects which give television viewers an impression as if they were really present in the scene.

In providing viewers with the vivid feeling of being present in the scene, a horizontally wide screen is desirable. The EDTV and HDTV systems therefore employ a screen of a 16-to-9 aspect ratio, considering the results of studies on visual and psychological effects of the screen. When a picture image of the NTSC system with a 4-to-3 aspect ratio is displayed on the screen of the EDTV receiver with a large aspect ratio without changing the aspect ratio of the former, or when it is up-converted and displayed on the HDTV receiver, or when a picture of the HDTV system is down-converted to produce a picture of 4-to-3 aspect ratio of NTSC system and displayed on the NTSC or EDTV receiver with a large aspect ratio, blank areas are formed on the right and left of the screen, as shown in FIG. 3. The blank areas on the screen appear at black level, so that if this kind of display with unmatched aspect ratio continues for a long period of time, phosphor materials on the image area and on the blank area deteriorate to different fatigue levels. When in this condition the whole area of the screen is used, a portion of the screen corresponding to the blank area appears brighter than the remaining portion corresponding to the image area, forming a line at the boundary between the two areas. This is the result of an uneven degradation of CRT.

SUMMARY OF THE INVENTION

The present invention has been accomplished to overcome the above drawbacks and its objective is to provide an image display system which makes effective use of a blank area that occurs when a picture smaller in size than the screen of the television receiver is displayed on the screen, and which prevents ununiform deterioration of a cathode ray tube.

To achieve the above objective, the image display system according to this invention is characterized in that on a large-aspect-ratio screen of a television receiver a picture with a smaller aspect ratio is displayed and, on the remaining blank area of the screen, multiplexed character data is displayed.

The image display system also comprises: a first buffer memory and a second buffer memory for storing a video signal of the NTSC system and character multiplex data superimposed on the video signal at timings of a first clock signal and a second clock signal, respectively, said first and second buffer memories outputting the stored video signal and the character data at timing of a third clock signal whose frequency is 4/3 times that of the first clock signal; a selector switching between the first and second buffer memories at a specified horizontal position for each line to select and output either a first video signal from the first buffer memory representing a picture or a second video signal from the second buffer memory representing multiplex characters; and a television receiver having a screen with a 16-to-9 aspect ratio, the television receiver displaying on the right or left side of the screen an NTSC picture with an aspect ratio of 4 to 3 obtained from the first video signal output from the selector, the television receiver further displaying on a blank area at the remaining left or right side of the screen character multiplex data obtained from the second video signal.

In this invention, the video signal of standard NTSC system with a 4-to-3 aspect ratio and 525 scanning lines is converted into a digital signal and further into three primary RGB color signals before being output. Character broadcast data superimposed on the vertical retrace period of the video signal is extracted by a character multiplex decoder, which produces pattern data and FIGURE data as RGB signals representing corresponding characters and FIGURES.

Of these RGB signals thus produced, the video signals are written into a first buffer memory by a first clock signal with a frequency, say, four times that of a color subcarrier $f_{sc}$, and the character data is written into a second buffer memory by a second clock signal with a frequency, say, 16/5 times that of the color subcarrier $f_{sc}$. They are both read out by a third clock signal with a frequency 4/3 times that of the first clock signal. This quickens the horizontal sweeping speed, preventing the image from being expanded horizontally as would occur if the RGB signals were directly supplied to the television receiver.

The speed-converted outputs of the first and second buffer memories are alternately picked up by a selector that switches between the two buffer memories at a specified horizontal position for each line, and the selected outputs are fed to the television receiver with a 16-to-9 aspect ratio and 525 scanning lines. Now, a picture of standard NTSC system with a 4-to-3 (12-to-9) aspect ratio is displayed on the left side of the screen, with character data shown in the blank area on the right.

With this invention, the blank area on the screen is effectively utilized and the uneven degradation of the cathode ray tube can be prevented.

PREFERRED EMBODIMENT OF THE INVENTION

Figure 1:
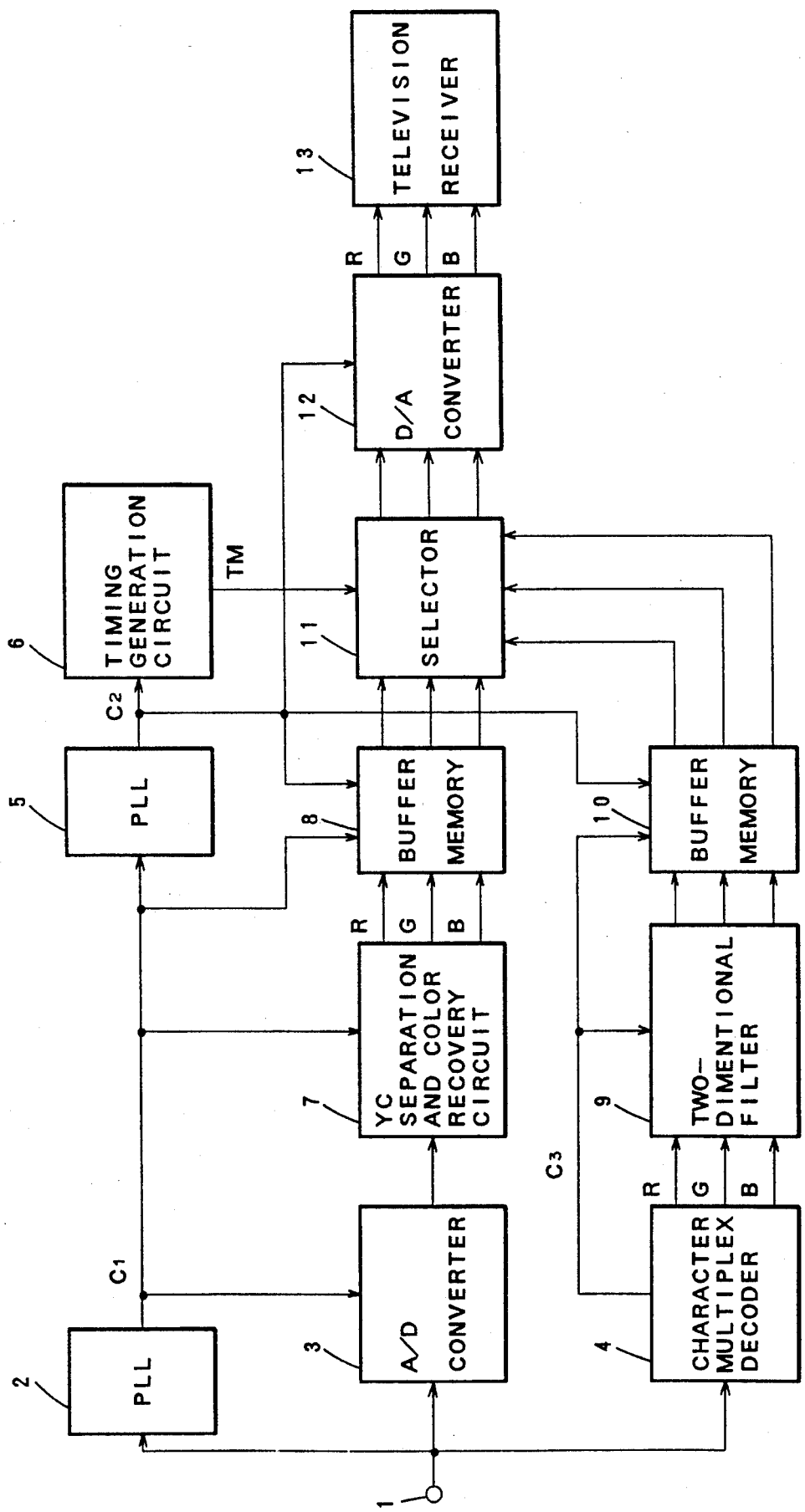
FIG. 1 is a block diagram showing one embodiment of the image display system according to this invention.

FIG. 1 shows a block diagram of the image display system as one embodiment of this invention. In this embodiment, we will explain the process of displaying a picture of standard NTSC system with a 4-to-3 aspect ratio on a screen of the NTSC receiver with a wide aspect ratio of 16-9.

In FIG. 1, an input terminal 1 receives a composite color TV signal of standard NTSC system with a 4-to-3 aspect ratio and 525 scanning lines and is connected to a first PLL circuit 2, an A/D converter 3 and a character multiplex decoder 4. The first PLL circuit 2 extracts a color subcarrier $f_{sc}$ of 3.58 MHz from the input color TV signal and multiplies the frequency by a factor of four to produce a clock signal $C_1$, which has a frequency of $4f_{sc}$. The output of the first PLL circuit 2 is connected to a second PLL circuit 5. The second PLL circuit 5 multiplies the frequency $4f_{sc}$ of the clock signal $C_1$ by a factor of 4/3 (=(16/9)÷(4/3)) to produce a clock signal $C_2$. The output of the second PLL circuit 5 is connected to a timing generation circuit 6. The timing generation circuit 6 generates a timing signal TM to specify a horizontal position at which the screen of the television receiver is divided into a picture region and a character region.

The A/D converter 3 samples the NTSC signal, according to the clock signal $C_1$ as a sampling signal, to produce a digital NTSC signal with 910 samples/line, which is output to a YC separation and color recovery circuit 7. The YC separation and color recovery circuit 7, according to the clock signal $C_1$, separates the digital NTSC signal into a luminance signal Y and chrominance signals I and Q and performs a reverse-matrix conversion on these signals to obtain the three primary color RGB signals. The output of the YC separation and color recovery circuit 7 is fed to a buffer memory 8.

The character multiplex decoder 4 extracts character broadcast data superimposed on the vertical retrace period of the NTSC signal and outputs RGB signals representing characters and FIGURES. The decoder 4, after extracting the character signal from the NTSC signal, performs error correction, decodes the character broadcast data and, according to the decoded data, reads out pattern data and FIGURE data stored in a character generator. The pattern and FIGURE data thus read out are written into a video memory and converted into RGB signals before being output. The output of the character multiplex decoder 4 is connected to a two-dimensional filter 9. The two-dimensional filter 9 either increases or reduces the number of scanning lines according to the size of the characters or FIGURES to be displayed on the television screen and thereby changes the number of picture elements or pixels displayed. This filter is controlled by a clock signal $C_3$ output from the character multiplex decoder 4 whose frequency is $16/5 \cdot f_{sc}$. The output of the two-dimensional filter 9 is connected to a buffer memory 10.

The buffer memory 8 is a high-speed conversion circuit that stores the RGB signals from the YC separation and color recovery circuit 7 at the timing of the clock signal $C_1$ and outputs them at the timing of the clock signal $C_2$. The buffer memory 10 stores the RGB signals from the two-dimensional filter 9 at the timing of the clock signal $C_3$ and outputs them at the timing of clock signal $C_2$. These two buffer memories 8 and 10 are both connected to a selector 11.

The selector 11 switches, at a horizontal position specified by the timing signal TM, between the two buffer memories to pickup either the video signal for picture fed from the buffer memory 8 or the video signal for character fed from the buffer memory 10. The output of the selector 11 is supplied to a D/A converter 12.

The D/A converter 12, according to the clock signal $C_2$ as a sampling signal, converts the digital video signal from the selector 11 into an analog video signal. The output of the D/A converter 12 is fed to the RGB terminal of the TV receiver 13.

The TV receiver 13 is an NTSC receiver with 525 scanning lines and a horizontal scanning frequency of 15.73 kHz and which has a large aspect ratio (16-to-9) with a wide horizontal sweeping width so that it can display a picture of 16-to-9 aspect ratio.

In this configuration, when a video signal of standard NTSC system with 525 scanning lines and 4-to-3 aspect ratio is supplied to the input terminal 1, the video signal is converted into a digital signal by the A/D converter 3 and further converted into three primary color RGB signals by the YC separation and color recovery circuit 7, before being sent to the buffer memory 8. The character broadcast data is extracted by the character multiplex decoder 4, which produces pattern data and FIGURE data as RGB signals representing the corresponding characters and FIGURES and sends them to the two-dimensional filter 9. The RGB signals supplied to the filter 9 are further converted into RGB signals that have a specified number of pixels corresponding to the characters and FIGURES to be displayed on the screen. The converted RGB signals are then fed to the buffer memory 10.

The RGB signals supplied to the buffer memories 8 and 10 are written into these buffer memories 8 and 10 by the clock signals $C_1$ and $C_3$ and are read out by the clock signal $C_2$ with a frequency 4/3 times that of the clock signal $C_1$. This increases the horizontal sweep speed, preventing the picture from being displayed horizontally expanded as would occur if the video signals were directly supplied to the TV receiver.

Figure 2:
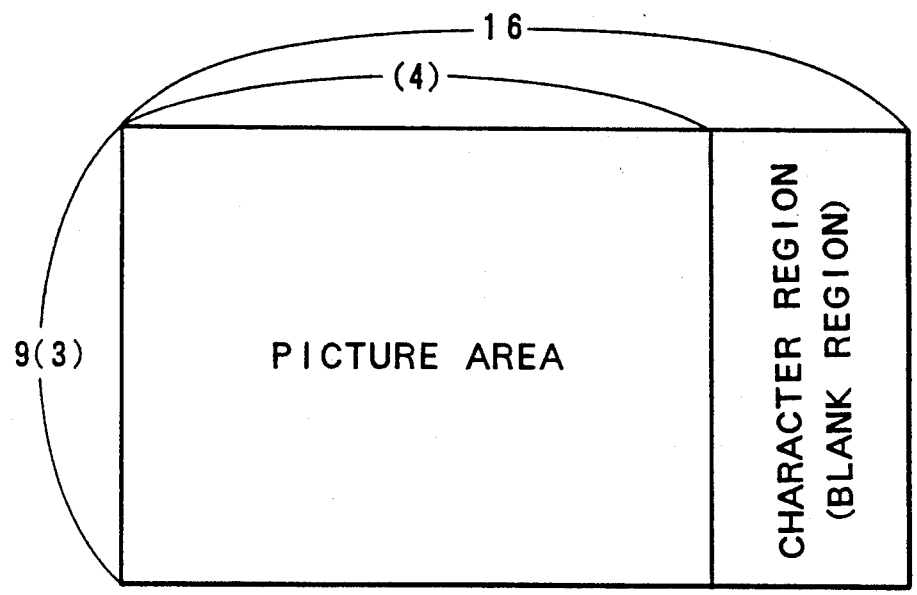
FIGS. 2 and 3 are examples of how pictures are displayed on the television receiver.
Figure 3:
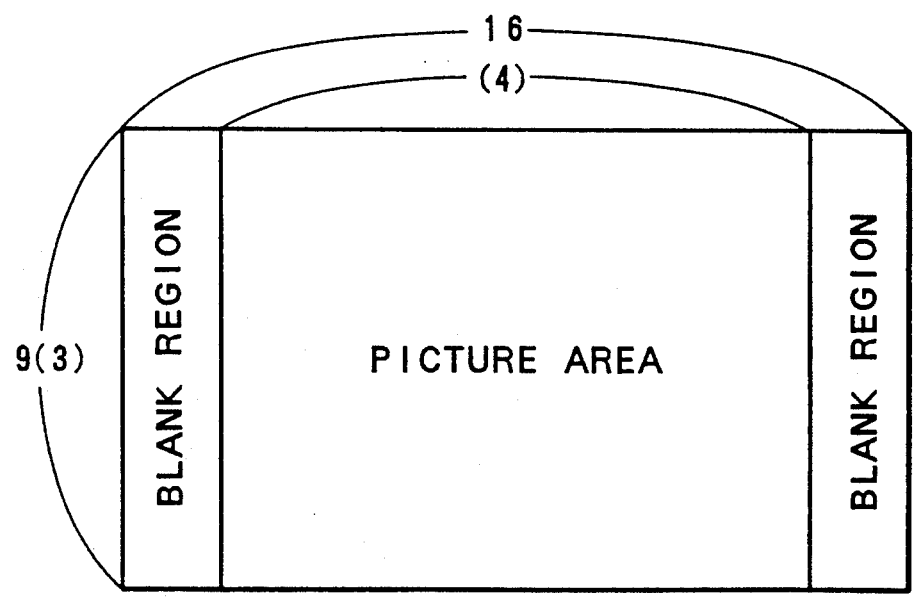

The speed-converted outputs of the buffer memories 8 and 10 are fed to the selector 1, which under the control of the timing signal TM switches between the two buffer memories at a specified horizontal position for each line. For example, as shown in FIG. 2, the switching of the selector 11 is done in such a way as to display a picture on the left side of the screen and characters on the right side.

On the screen of the television receiver 13 with a wide aspect ratio of 16 to 9 and 525 scanning lines, therefore, a standard NTSC picture with 4-to-3 aspect ratio and 525 scanning lines appears on the left side and character data is displayed on the blank region on the right.

While in the above embodiment the description concerns an example case of displaying a picture of the standard NTSC system on the NTSC TV receiver with a wide aspect ratio, this invention is also applicable to other cases, such as displaying a standard NTSC picture on an EDTV receiver with a wide aspect ratio, or up-converting the standard NTSC picture and displaying it on a HDTV receiver.

The advantages of this invention may be summarized as follows. When a picture with a small aspect ratio is displayed on a large-aspect-ratio TV receiver, a blank area is formed somewhere on the screen. On that blank area, multiplexed character data is shown. This prevents the uneven deterioration of the cathode ray tube and at the same time makes effective use of the blank region. Because the multiplexed character data is not superimposed on the picture, the picture can be displayed intact without any obstruction.

What is claimed is:

1. An image display system comprising:
   a first buffer memory and a second buffer memory for storing a video signal of the NTSC system and character multiplex data superimposed on the video signal at timings of a first clock signal and a second clock signal, respectively, said first and second buffer memories outputting the stored video signal and the character data at timing of a third clock signal whose frequency is 4/3 times that of the first clock signal;
   a selector switching between the first and second buffer memories at a specified horizontal position for each line to select and output either a first video signal from the first buffer memory representing a picture or a second video signal from the second buffer memory representing multiplex characters; and
   a television receiver having a screen with a 16-to-9 aspect ratio, said television receiver displaying on the right or left side of the screen an NTSC picture with an aspect ratio of 4 to 3 obtained from the first video signal output from the selector, said television receiver further displaying on a blank area at the remaining left or right side of the screen character multiplex data obtained from the second video signal.

2. An image display system as claimed in claim 1, wherein said second clock signal for giving a timing at which to write the character multiplex data or second video signal into the second buffer memory has a frequency 4/5 times that of the first clock signal and the third clock signal for giving a timing at which to read the first and second video signals has a frequency 4/3 times that of the first clock signal.

3. An image display system as claimed in claim 1, wherein said first clock signal has a frequency four times that of an input color subcarrier.

4. An image display system for displaying on a screen of a television receiver having a large aspect ratio (a) a video signal having an aspect ratio smaller than said large aspect ratio of said screen and (b) character data superimposed on said video signal comprising:
   an A/D converter with a first clock for converting said video signal into a digital video signal;
   a first memory into which said digital video signal is written by said first clock;
   said character multiplex decoder for extracting a character data superimposed on said video signal;
   a second memory into which said character multiplexed data is written by a second clock;
   an output means with a third clock for outputting said digital video signal and said character data written in said first memory and said second memory respectively;
   a selector for selecting between said digital video signal and said character data outputted by said output means at a specified horizontal position for each line to output either said digital video signal or said character data; and
   a D/A converter for converting said digital video signal from said selector into an analog video signal,
   wherein said video signal having said aspect ratio smaller than said aspect ratio of said screen is displayed on one of a right side and a left side of said screen according to said digital video signal outputted from said selector, and said character data is displayed on a blank area of said screen where said video signal is not displayed according to said character data from said selector.

* * * * *